Apr. 3, 1923.
M. O. JOHNSON
FRUIT PEELING MACHINE
Filed Oct. 15, 1921
1,450,295
3 sheets-sheet 1
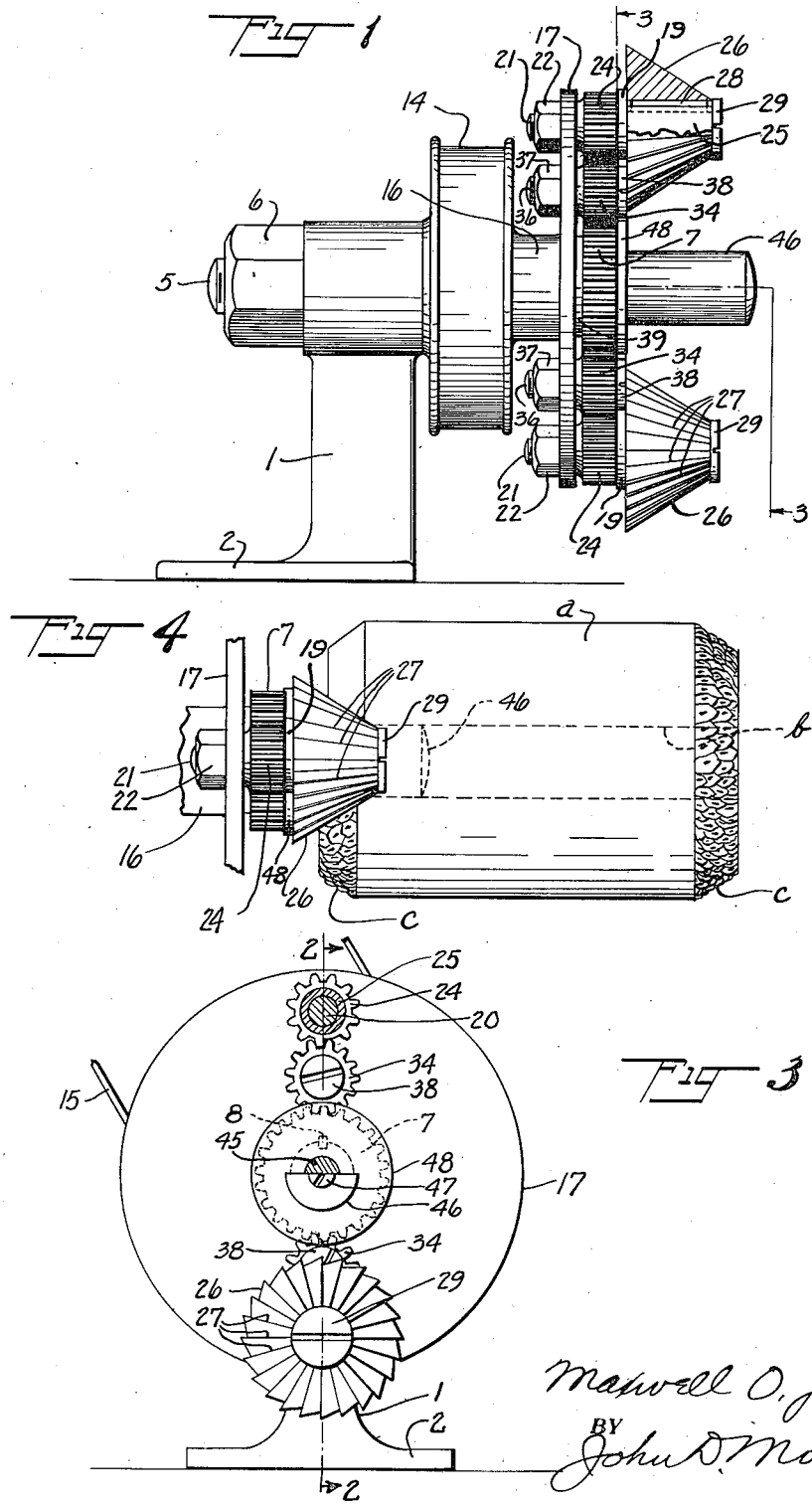

Apr. 3, 1923.
M. O. JOHNSON
1,450,295
FRUIT PEELING MACHINE
Filed Oct. 15, 1921   3 sheets-sheet 2
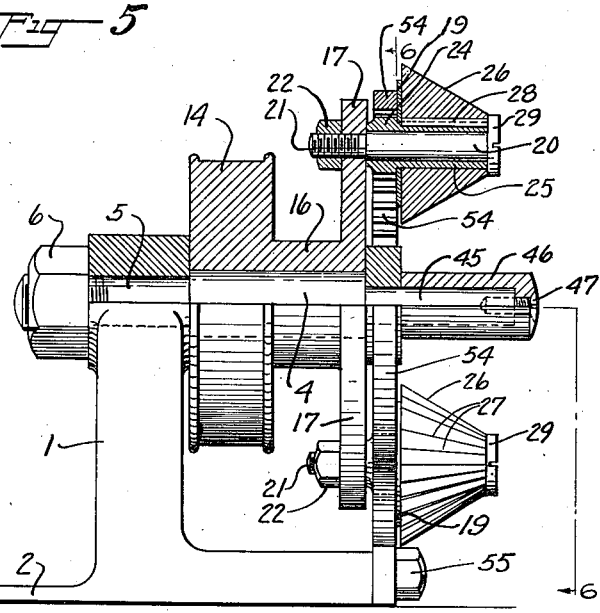
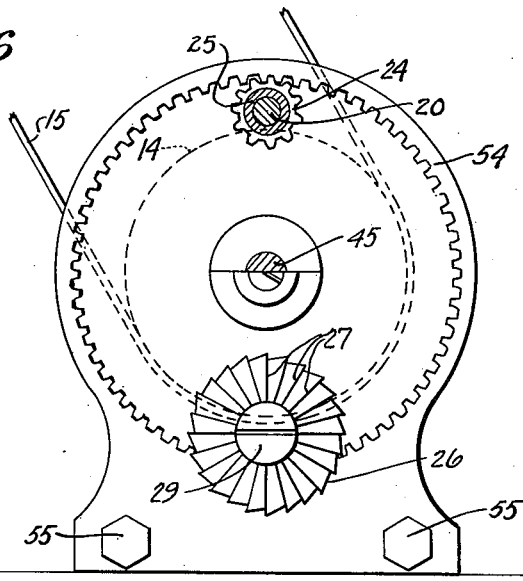
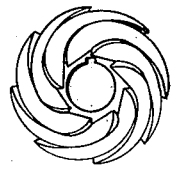

Apr. 3, 1923.
M. O. JOHNSON
FRUIT PEELING MACHINE
Filed Oct. 15, 1921
1,450,295
3 sheets-sheet 3
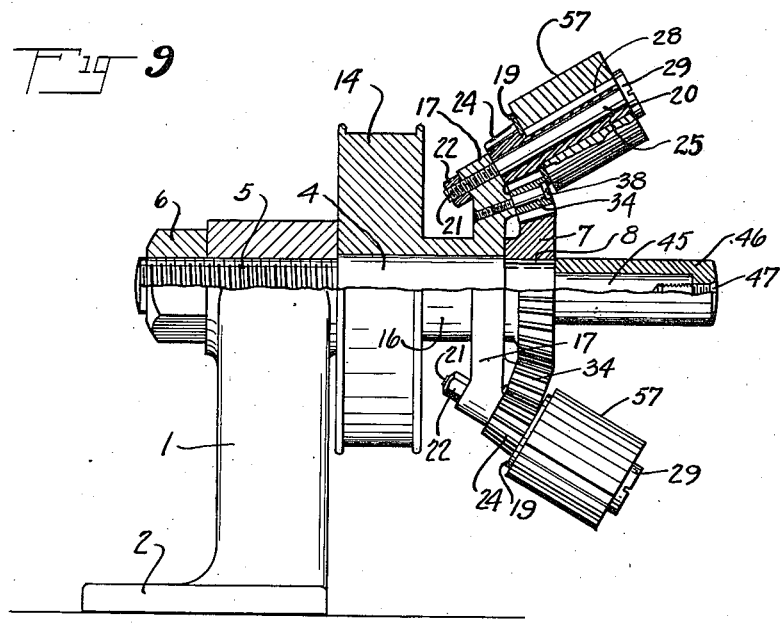
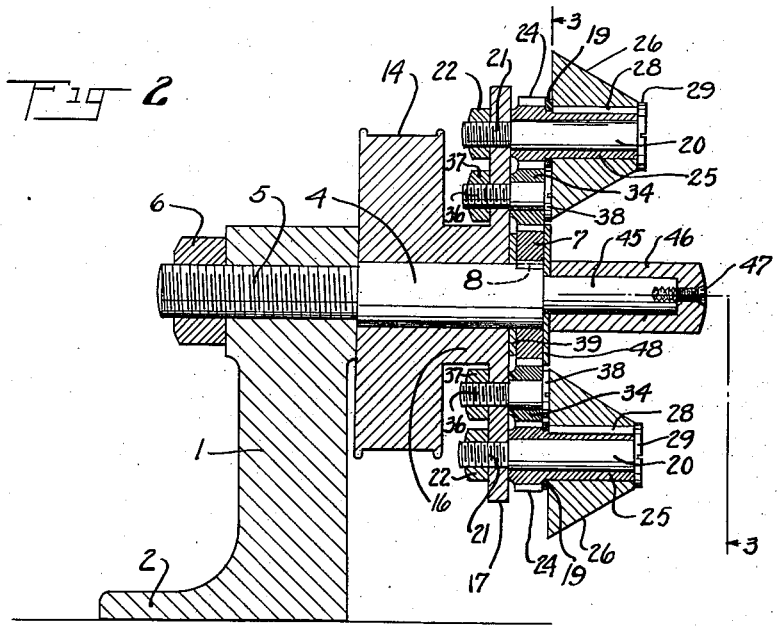
INVENTOR
Maxwell O. Johnson
BY John D. Morgan
ATTORNEY Patented Apr. 3, 1923.

1,450,295

UNITED STATES PATENT OFFICE.

MAXWELL O. JOHNSON, OF WAIPIO, TERRITORY OF HAWAII.

FRUIT-PEELING MACHINE.

Application filed October 15, 1921. Serial No. 507,954.

*To all whom it may concern:*

Be it known that I, MAXWELL O. JOHNSON, a citizen of the United States, residing at Waipio, in the county of Honolulu and Territory of Hawaii, have made certain new and useful Improvements in Fruit-Peeling Machines, of which the following is a specification.

The invention relates to fruit peeling machines and more particularly to machines for peeling the ends of the cored parts of pineapples as prepared for canning.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is an elevation of a machine embodying the invention;

Fig. 2 is a central vertical section through the machine parallel to the plane of the paper in Fig. 1 and on the line 2—2 of Fig. 3;

Fig. 3 is an end view, looking at Figs. 1 and 2 from the right, being partly in elevation and partly in section on line 3—3 of Figs. 1 and 2;

Fig. 4 is a fragmentary detail, in top plan, looking down on the right-hand ends of Figs. 1 and 2, and showing the mechanism operating on a pineapple;

Fig. 5 is a view partly in elevation and partly in longitudinal, vertical, central section, showing a modified form of the mechanism;

Fig. 6 is an end view, looking at Fig. 5 from the right, partly in elevation and partly in section along line 6—6 of Fig. 5;

Fig. 7 is a detached detail of one form of peeling knife or cutter;

Fig. 8 is a similar view looking at Fig. 7 from the right;

Fig. 9 is a side elevation, partly in longitudinal vertical section, of a different form of gearing drive for the peelers.

In modern factories for canning pineapples, the central portion of the fruit is cut out longitudinally thereof in cylindrical form by a machine, and of a size to fit snugly within the cans in which it is packed for commerce. This operation is styled "shaping." The tops and bottoms of these cylinders are cut off to remove the irregularly shaped, peel-covered ends.

Usually simultaneously with the shaping, a cylindrical core is cut out centrally and longitudinally of the cylinder, this portion of the fruit being non-edible or at least very inferior. This operation is called "coring."

To avoid waste and to have the cylinders of fruit as long as possible, the top and bottom thereof are cut off in as thin a slice as possible. This leaves at each end of the cylinder of fruit a diagonally disposed or somewhat rounded rim of rind or eyes which it is necessary to remove before slicing and canning the shaped and cored fruit. By this manner of working, practically two additional slices are saved, or added, for canning from each cylinder of fruit.

Up to the present time, these annular strips of rind or eyes left on the ends of the cylinders of pineapple have been trimmed or peeled off by hand labor at the trimming tables, before the fruit passes on to the slicing machines, to be sliced into the circular discs preparatory to canning. This hand work is slow and wasteful, as one trimmer can handle only two or three pineapples per minute, and careless trimming removes a great deal of the usable and valuable part of the fruit. With the present invention, one workman can trim twenty or more pineapples per minute.

The present invention provides a machine especially capacitated to receive the "shaped," and preferably "cored" pineapple and to quickly, efficiently and economically remove the strips of rind or eyes from the ends of the cylinders, and at the same time to guard against wastage of the fruit in the peeling operation.

Referring now in detail to the embodied forms of the device, it will be understood that the various modifications shown are not restrictive, but are exemplary in character, and that other forms may be included within the invention, those here shown being the present preferred forms for different purposes and under different conditions.

Referring now in detail to Figs. 1 to 4, a machine frame or pillar 1 has a spreading foot or base 2 which rests upon a table or other suitable support, and may be fastened to the support in any suitable manner, if desired, as by screws, bolts, clamps or the like.

As embodied, there is supported on or in the top end of the pillar 1 a horizontally disposed shaft 4 which serves as a support for the peeling mechanism and also for the cored pineapple or other fruit to be peeled. In the present detailed form, the shaft 4 has the rear portion provided with a screw-thread 5, which is threaded into a corresponding screw-threaded aperture in the upper part of the pillar or frame 1. A nut 6 is screw-threaded onto the end of the shaft to hold it in position, the shaft being preferably shouldered to fit against the front end of the pillar 1. As at present preferred, the shaft 4 is fixed or non-rotatable.

In said embodied form, the cutter or cutters are rotatable and have rotation simultaneously about the fruit holder and also about their own centers. For this purpose there is non-rotatably fixed upon shaft 4 a gear wheel 7, fixed thereto by a key 8. As embodied, the means for rotating the cutters or peelers cooperate with this gear wheel 7.

The peeling mechanism and its driving means, as embodied comprise a belt pulley 14, rotatably mounted on shaft 4, and driven by a belt 15, although any other suitable or standard form of drive may be employed. Integral with or fixed to the pulley 14 is a sleeve 16, surrounding the shaft 4, the sleeve terminating in a plate 17, of circular or other form, which constitutes the support for the peelers and part of their driving mechanism.

A plurality of peeling mechanisms are preferably employed, and two such mechanisms, diametrally disposed with reference to shaft 4 are shown. A single description will suffice for both. As embodied, a shaft 20 is fixed to the rotating plate or disc 17, the shaft preferably being non-rotatable with respect to the plate 17. Shaft 20 is screw-threaded at 21 into plate 17 and is held in place by a nut 22 screw-threaded thereon, the shaft being preferably slightly shouldered to fit against the plate.

Loosely mounted on shaft 20 is a pinion 24 having its hub extending outwardly as a sleeve 25 about the shaft 20. Fixed on the sleeve 25 is the peeler 26, which is held by a key 28 and by the head 29 on shaft 20. The peeler is conoidal in form and has its periphery consisting of a plurality of longitudinally disposed cutting edges 27, which are inclined outwardly and also toward the shaft.

For the purpose of driving the peelers, pinion 24 meshes with a pinion 34, loosely mounted on a shaft 35, which shaft is shouldered against plate 17, and is threaded into the plate by a screw-thread 36; a nut 37 being screwed thereon. A head 38 on the shaft also serves to hold the pinion in place. Pinion 34 meshes also with the fixed gear-wheel 7, which is fixed on shaft 4. A washer 39 is preferably interposed between plate 17 and gear wheel 7. The washers 19 keep the peelers 26 from working back on their shafts and rubbing on heads 38.

In the present embodiment, the fruit to be peeled, and referring more especially to the cored pineapple, is held stationary during the peeling by a support on the machine which engages frictionally within the central opening in the fruit. In the embodied form, the outer end of shaft 4 is reduced or shouldered down, as shown at 45, and a hollow spindle or support 46 fits over this part of the shaft, and is held in place by a screw 47 passing through the end of the support and screwing into the end of the reduced part of the shaft. The support 46 at its inner end bears against a washer 48.

In operation (see especially Fig. 4) the cored pineapple $a$ is placed upon the spindle or support 46, which fits friction tight within the central opening $b$ within the fruit thereby holding the fruit stationary upon the spindle. As pulley 14 is rotated, plate 17 rotates therewith and loose pinions 34 are swept around the stationary gear 7 and are thereby rotated and so impart rotation to pinions 24 and to the peelers 26. Thus the rind $c$ is removed from the fruit.

The mechanism is exceedingly compact and simple. The peeling action is also very effective, especially for fruits which are more or less difficult to peel, as the peeling action is effected by a plurality of successive cuts and not by pushing a single cutting edge continuously through the fruit. Also, the velocity and frequency with which the cutting edges strike the fruit may be made quite high without requiring excessive rotative speed of the pulley or other driving means. It will also be clear that by changing the form of the cutting edges 27 the form of the cut or peeling may be changed from the straight bevel shown, to accommodate the form or condition of the particular fruit being peeled.

In the modified form of Figs. 5 and 6, a different form of gearing is shown for driving the peelers 26. In this form, the pinions 24 are in mesh with an internally geared ring 54, which is fixed to the base 2 of the frame by screw bolts 55. The operation is otherwise the same as that of the mechanism of the preceding figures, so far as concerns the essential features thereof.

In Figs. 7 and 8 another form of the peeling cutters is shown, having spirally shaped cutting edges, which may be employed if desired or where especially adapted for certain kinds of work.

In Fig. 9 a still somewhat different form of peeler and of the gear drive for the peelers is shown. A beveled gear wheel 56 is fixed to shaft 4, similarly to gear wheel 7 in Figs. 1 to 3. The pinions 34 engage in like manner with beveled gear wheel 56, and cylindrical cutters 57 are employed, due to the different inclination or direction of the shafts.

The invention in its broader aspects is not limited to the specific mechanisms shown and described but departures may be made therefrom within the scope of the accompanying claims without departing from the principles of the invention and without sacrificing its chief advantages.

What I claim is:—

1. A machine for trimming pineapples including in combination a spindle for engaging within and holding a cored pineapple, and a rotating peeling device having simultaneous rotation about its own center and also about said spindle.

2. A machine for trimming pineapples including in combination a spindle for engaging within and holding a cored pineapple stationary, and a rotating peeling device having simultaneous rotation about its own center and also about said spindle.

3. A machine for trimming pineapples including in combination a spindle for engaging within and holding a cored pineapple, and a rotating peeling device having conoidal cutting means and having simultaneous rotation about its own center and also about said spindle.

4. A machine for trimming pineapples including in combination means for holding a shaped pineapple with its end in position to be peeled, and peeling means comprising a rotating peeling device, and means for rotating it about its own center, and means for rotating it about but spaced away from the center of the shaped pineapple so as to peel only the outer circular edge thereof.

5. A machine for trimming pineapples including in combination stationary means for holding a shaped pineapple with its end in position to be peeled, and peeling means comprising a rotating peeling device and means for rotating it about its own center and means for rotating it about but spaced away from the center of the shaped pineapple so as to peel only the outer circular edge thereof.

6. A machine for trimming pineapples including in combination means for holding a shaped pineapple longitudinally stationary with its end in position to be peeled, and peeling means comprising a rotating peeling device and means for rotating it about its own center and means for rotating it about but spaced away from the center of the shaped pineapple so as to peel only the outer circular edge thereof.

7. A machine for trimming pineapples including in combination means for holding a shaped pineapple and locating a flat end thereof in position to be peeled, and peeling means comprising a rotating peeling device and means for rotating it about its own center and means for rotating it about but spaced away from the center of the shaped pineapple so as to peel only the outer circular edge thereof.

8. A machine for trimming pineapples including in combination a spindle supporting a shaped pineapple and stationarily locating the flat end thereof, and peeling means comprising a peeler rotating about its own center and also about the spindle but spaced away therefrom so as to peel only the circular edge of the pineapple.

In testimony whereof, I have signed my name to this specification.

MAXWELL O. JOHNSON.